April 12, 1955
H. M. UNSCHULD
2,705,941
APPARATUS FOR AND METHOD OF TREATING GASOLINE
IN INTERNAL COMBUSTION ENGINES
Filed March 10, 1954
2 Sheets-Sheet 1
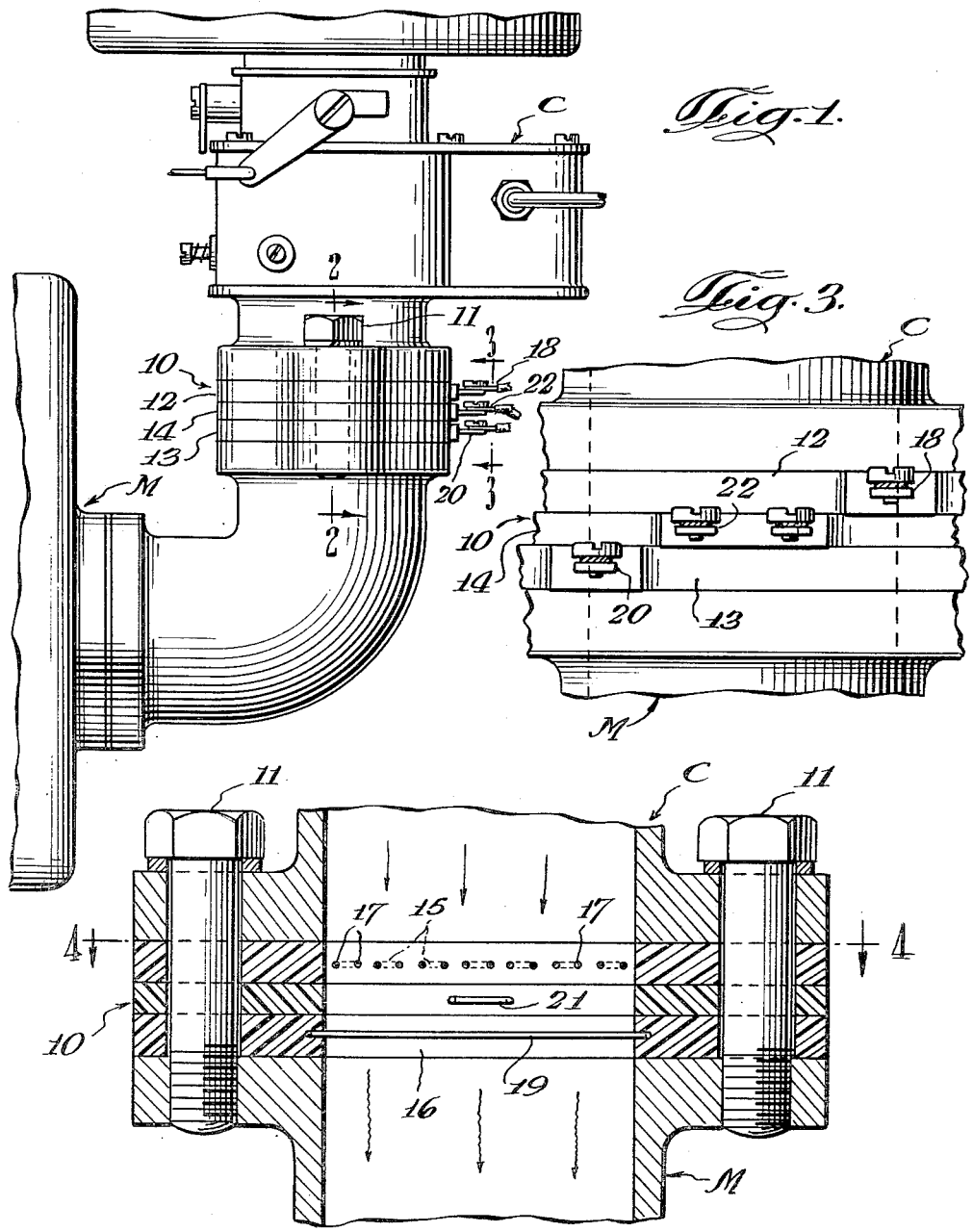
Inventor
Henry M. Unschuld
By Schroeder, Hofgren, Brady & Wegner
Attorneys April 12, 1955     H. M. UNSCHULD     2,705,941
APPARATUS FOR AND METHOD OF TREATING GASOLINE
IN INTERNAL COMBUSTION ENGINES
Filed March 10, 1954     2 Sheets-Sheet 2

Inventor
Henry M. Unschuld
By Schroeder, Hofgren, Brady & Wegner
Attorneys

2,705,941

APPARATUS FOR AND METHOD OF TREATING GASOLINE IN INTERNAL COMBUSTION ENGINES

Henry M. Unschuld, Mount Carmel, Ill., assignor of one-half to Fred Voigt, Edmonton, Alberta, Canada Application March 10, 1954, Serial No. 415,300

20 Claims. (Cl. 123—119)

This invention relates to apparatus for and to a method of treating gasoline in internal combustion engines, and in particular it relates to the treatment of gasoline as it passes from the carburetor to the intake manifold of an engine so as to improve combustion.

It is well known that internal combustion engines are subject to combustion troubles which are greatly reduced if the engine is operated on a hydrocarbon fuel having a high octane rating.

It is also well known that combustion problems are aggravated in cold weather because of the fact that the cylinders are cold, and combustion is unsatisfactory until the engine is warmed. Many attempts have been made to improve engine performance by placing a heating coil between the carburetor and the intake manifold of an engine so as to heat the combustible mixture of atomized hydrocarbon fuel and air as it leaves the carburetor.

In accordance with the present invention the mixture of atomized gasoline and air leaving the carburetor is heated to a temperature above 150° F. and below the flash point of the mixture while passing between spaced electrodes in the presence of a metal which may act as a catalyst in hydrocarbon reactions, and cyclic electric impulses are passed from one electrode to the other through the atomized gasoline. Such a treatment not only preheats the mixture, but raises the octane rating of the gasoline.

Conveniently the electrodes are embedded in a pair of dielectric gaskets which are mounted between the carburetor and the intake manifold, and the electrodes are wired into the electric system of the engine through two parallel circuits, one of which provides a continuous flow of electricity when the engine is running, and the other of which contains means for rapidly interrupting the flow of electricity to provide the cyclic impulses. A thermocouple in the space between the electrodes controls a solenoid operated switch which transfers the electrodes from the continuous circuit to the impulse circuit above a predetermined temperature.

The apparatus of the invention is illustrated in a preferred embodiment in the accompanying drawings, in which:

Fig. 1 is a side elevational view of the lower portion of the carburetor and intake manifold in an internal combustion engine with the apparatus of this invention mounted therebetween;

Fig. 2 is a fragmentary sectional view on an enlarged scale taken as indicated along the line 2—2 of Fig. 1;

Fig. 3 is an enlarged fragmentary sectional view taken as indicated along the line 3—3 of Fig. 1;

Fig. 4 is a section taken as indicated along the line 4—4 of Fig. 2 with a portion of the gasket material broken away; and Fig. 5 is a wiring diagram.

Referring to the drawings in greater detail, and referring first to Fig. 1, a carburetor C of an internal combustion engine is mounted on top of the entrance passage for the intake manifold M of the engine, and the apparatus of the present invention, indicated generally at 10, is positioned between the carburetor C and the entrance passage for the manifold M by means of the usual threaded studs 11.

The apparatus 10 consists of a pair of flanking gasket members 12 and 13 and an intermediate gasket member 14 all of which are formed of dielectric material and have the usual projecting apertured wing portions to receive the threaded studs 11. As best seen in Figs. 2 and 4, each of the flanking gasket members 12 and 13 is provided with an embedded wire grid which forms an electrode, said grids being designated as 15 and 16, respectively. Using the electrode 15 as an example, the grid consists of a single length of an electrically conductive wire which has an end portion embedded in the gasket member 12, and is doubled back upon itself a number of times so that it crosses the opening in the gasket member in a plurality of parallel runs 17. The opposite end of the wire is in contact with an electric terminal 18. The electrode 16 is constructed in precisely the same fashion as the electrode 15, except that the runs 19 of the wire forming the electrode 16 extend at right angles to the grid of the electrode 15. The electrode 16 has an end in contact with an electric terminal 20. The electrodes 15 and 16 are separated by a distance of about ⅜ inch.

The center gasket member 14 supports a thermocouple 21 which is connected with a pair of electric terminals 22 in the gasket member 14.

The electrodes 15 and 16 are electrically connected to the electric system of the internal combustion engine by means of a first electric circuit, indicated generally at 23, which is adapted to provide a continuous flow of electricity to the electrodes when the engine is running. A second electric circuit, indicated generally at 24, also connects the electrodes 15 and 16 to the electric system of the engine, and is provided with a circuit breaker mechanism 25, so that when electricity is supplied to the electrodes 15 and 16 through the circuit 24 the electrodes receive cyclic electric impulses. The circuit breaker 25 may be of any suitable type, and should deliver at least 60 impulses per second to the electrodes, and may suitably operate up to 300 or somewhat more cycles per second.

The circuit 23 and the circuit 24 are connected to the electrodes through a two-position solenoid operated switch 26 which is under the control of the thermocouple 21, so that the electrodes 15 and 16 are connected with the continuous circuit 23 up to a pre-determined minimum temperature, and are then transferred to the intermittent, or cyclic impulse circuit 24.

When the engine is operating, the carburetor C produces a combustible mixture of liquid hydrocarbon fuel, such as gasoline, which passes through the apparatus 10 into the intake manifold M. The atomized gasoline passing through the apparatus 10 acts as a conductor for the current supplied to the electrodes 15 and 16, so that there is essentially a silent discharge of electricity from one electrode to the other. The electrodes are composed of a metal which may act as a catalyst in hydrocarbon reactions. Metals which are presently known to have such a catalytic action are nickel, copper and platinum. The diameter of the wire which is used to form the electrodes will vary depending upon which of the three metals is employed for the electrodes, on account of the different resistances of the metals, and the diameter may be in the range of 1–3 mm.

The thermocouple 21 is designed to transfer the operation of the electrodes from a continuous current flow through the circuit 23 to an intermittent flow through the circuit 24 at a temperature above 150° F. and below the flash point of the combustible mixture. The optimum temperature varies somewhat with the type of metal used in the electrodes. Nickel electrodes preferably are maintained at a temperature between 160–190° F. with the optimum temperature around 175° F.

The copper electrodes are operated at a temperature between 150–200°, again the preferred temperature being about 175° F.

The platinum electrodes operate at a temperature between 190–220°, preferably close to 195° F.

The apparatus of the present invention has two functions. It most important function is to raise the octane rating of the explosive mixture passing through the electrodes. This result is achieved by reason of the fact that the atomized liquid hydrocarbon fuel is subjected to cyclic electric impulses at an elevated temperature in the presence of a catalyst. The secondary effect is one which is found in various prior art devices, which is to preheat the combustible mixture before it enters the cylinders of the engine.

The foregoing detailed description is given for clearness of understanding only and no unnecessary limitations are to be understood therefrom, as some modifications will be obvious to those skilled in the art.

I claim:

1. Apparatus for treating gasoline passing from the carburetor to the intake manifold of an internal combustion engine having an electric system comprising: a pair of spaced electrodes extending across the passage from the carburetor to the intake manifold, said electrodes being electrically insulated from one another and one of said electrodes being of a metal which may act as a catalyst in hydrocarbon reactions; electric conductor means connecting each of said electrodes to the electric system of the engine so that when the engine is running an electric circuit is completed through the atomized hydrocarbon fuel between the electrodes; and means for rapidly interrupting the flow of electricity through said conductor means so as to provide cyclic electric impulses to said electrodes.

2. The apparatus of claim 1 in which the electric conductor means includes a first circuit which is adapted to supply electricity to said electrodes continuously and a second circuit which is provided with said means for rapidly interrupting the flow of electricity, and switch means for transferring the electrodes from one to the other of said circuits.

3. The apparatus of claim 1 in which each electrode comprises an electric conductor wire forming a grid of spaced, parallel runs of wire extending across the passage, and said electrodes are in parallel, spaced relationship to one another.

4. The apparatus of claim 3 in which the runs of wire in one electrode are at right angles to the runs of wire in the other electrode.

5. Apparatus for treating gasoline passing from the carburetor to the intake manifold of an internal combustion engine having an electric system comprising: a pair of spaced electrodes extending across the passage from the carburetor to the intake manifold, said electrodes being electrically insulated from one another and one of said electrodes being of a metal which may act as a catalyst in hydrocarbon reactions; first electric conductor means which connects said electrodes to the electric system of the engine so that when the engine is running said conductor means supplies electricity continuously to the electrodes and a circuit is completed through the atomized hydrocarbon fuel between the electrodes; second electric conductor means provided with means for rapidly interrupting the flow of electricity therethrough so as to provide cyclic electric impulses to said electrodes; and thermally controlled switch means for transferring said electrodes from said first conductor means to said second conductor means when the temperature at the electrodes exceeds a predetermined minimum.

6. The apparatus of claim 5 in which the electrodes are nickel and the thermally controlled switch means transfers the electrodes to the second conductor means at a temperature in the range of 160° F. to 190° F.

7. The apparatus of claim 6 in which the switch means transfers the electrodes to the second conductor means at about 175° F.

8. The apparatus of claim 5 in which the electrodes are copper and the thermally controlled switch means transfers the electrodes to the second conductor means at a temperature in the range of 150° F. to 200° F.

9. The apparatus of claim 8 in which the switch means transfers the electrodes to the second conductor means at about 175° F.

10. The apparatus of claim 5 in which the electrodes are platinum and the thermally controlled switch means transfers the electrodes to the second conductor means at a temperature in the range of 190° F. to 220° F.

11. The apparatus of claim 10 in which the switch means transfers the electrodes to the second conductor means at about 195° F.

12. An electrode element for gasoline treating apparatus for an internal combustion engine, comprising; three abutting gasket members of dielectric material adapted to lie between the carburetor and intake manifold of an internal combustion engine; a grid of electric conductor wire embedded in each of the two flanking gasket members to form an electrode extending across the opening in the gasket member, one of said electrodes being composed of a metal which may act as a catalyst in hydrocarbon reactions; electric terminals on each gasket member; and a thermally responsive electrical control member embedded in the middle gasket member and projecting into the space between said electrodes, said control member being connected with a pair of electric terminals on the middle gasket member.

13. The electrode element of claim 12 in which the electrode is nickel.

14. The electrode element of claim 12 in which the electrode is copper.

15. The electrode element of claim 12 in which the electrode is platinum.

16. The method of treating the atomized hydrocarbon fuel entering the intake manifold of an internal combustion engine which comprises passing cyclic electric impulses from one electrode to another through said atomized hydrocarbon fuel at a temperature in excess of 150° F. and below the flash point of the fuel in the presence of a metal which may act as a catalyst in hydrocarbon reactions.

17. The method of treating the atomized hydrocarbon fuel entering the intake manifold of an internal combustion engine which comprises passing electric current from one electrode to another through said atomized hydrocarbon fuel at a temperature in excess of 150° F. and below the flash point of the fuel in the presence of a metal which may act as a catalyst in hydrocarbon reactions, and rapidly interrupting the passage of electricity to provide cyclic electric impulses through the atomized hydrocarbon fuel.

18. The method of claim 17 in which the metal is nickel and the temperature is about 175° F.

19. The method of claim 17 in which the metal is copper and the temperature is about 175° F.

20. The method of claim 17 in which the metal is platinum and the temperature is about 195° F.

No references cited.